June 14, 1938.  R. A. STEVENSON  2,120,634
PROCESS FOR TREATING SEWAGE
Filed Jan. 11, 1933
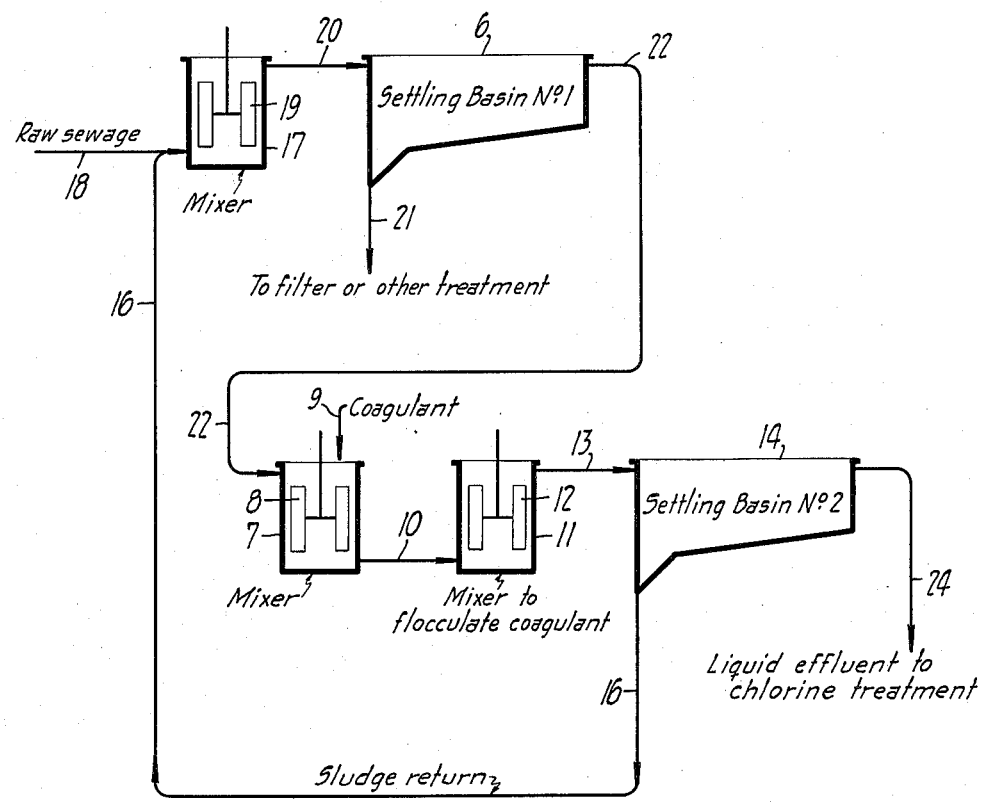
INVENTOR.
Ralph A. Stevenson
BY Robert H. Eckhoff
ATTORNEY.

Patented June 14, 1938

2,120,634

UNITED STATES PATENT OFFICE 2,120,634

PROCESS FOR TREATING SEWAGE

Ralph A. Stevenson, Palo Alto, Calif., assignor to Great Western Electro-Chemical Co., San Francisco, Calif., a corporation of California Application January 11, 1933, Serial No. 651,074

4 Claims. (Cl. 210—2)

This invention relates to the treatment of sewage in the disposal thereof and the object of this invention is to provide improvements in the chemical treatment of the incoming or raw sewage with chemically precipitated sludge from a subsequent treatment of the sewage, whereby, among other advantages, the odors of the incoming sewage are more quickly reduced, the efficiency of the first settling stage is much increased, and the sludge of the first settling stage is rendered more susceptible to further treatment such as vacuum filtration.

In the accompanying drawing the figure is a diagram or flow sheet showing the carrying out of the process.

Chemical sewage purification is not new, having been practiced quite extensively before the advent of the now familiar biological processes. Chemical purification as it was practiced in the early days was accomplished by adding a coagulant to raw sewage. Ferrous sulfate and lime was the usual coagulant. This treatment was successful in removing the suspended matter but was accompanied by serious disadvantages. One was that the effluent although clear would remain stable for only a very short time, soon becoming turbid and decidedly odorous. Another bad feature was that a tremendous volume of sludge was produced, and this usually increased the weight of dry solids to be disposed of by more than 100%. The poor stability and increased odor of the effluent was probably due to the fact that the causticity produced by the lime put into solution an amount of organic matter that would decompose when the causticity was neutralized by adsorption of carbon dioxide from the air.

I have overcome these difficulties by (1) using a ferric salt, such as ferric chloride, ferric sulphate, or chlorinated copperas as the coagulant, instead of lime and ferrous sulphate, (2) by applying the coagulant in a more efficient manner than heretofore practiced and (3) by utilizing the spent ferric hydroxide formed in the reaction as an aid to plain subsidence of the raw sewage in the first settling stage. Other advantages of the invention will appear in the description.

Briefly described, the process comprises treating the settled sewage, or rather the effluent from the primary basin, with a ferric salt, preferably the chloride, permitting the floc to settle with the sludge, then removing the resulting ferric hydroxide sludge and reintroducing it into the system with the raw sewage or influent at a point prior the ferric chloride treatment, agitating the sludge treated sewage, permitting it to settle, drawing off the resulting combined sludge and running the supernatant liquid sewage or effluent into the ferric chloride treatment first mentioned, followed by settling of this ferric chloride treated, or ferric hydroxide sludge for continuous re-use as stated. The effluent from the second settling basin after the ferric chloride treatment is run to waste or treated further as may be required.

In the diagram the stages of treatment bear descriptive legends and the flow is indicated.

The overflow from basin No. 1, indicated by 6 in the diagram, is run over through line 22 to a mixing mixer 7 fitted with a suitable agitator such as the paddles 8 while a solution of ferric chloride (in practice of about 40% concentration) is steadily introduced through line 9 in amount equal to about a grain of ferric chloride to the gallon of liquid being treated. From mixer 7 the liquid is run through line 10 to a second mixer 11 where the floc is built up by the slowly moving paddles 12. The precise amount of FeCl$_3$ or other ferric salt used for best results will of course depend on the condition of the sewage being treated. The mixing paddles 8 and 12 are preferably of a surface area equal to a quarter the area of a cross section of the mixing tank and a speed of about 10 R. P. M. in the first mixer 7 and about 3 R. P. M. in the second mixer 11 has been found satisfactory as I have discovered it is necessary for the paddles to travel slowly to build up a heavy floc, and that a high speed will act oppositely and tend to disintegrate and lighten the floc.

The ferric chloride reacts with the colloidal and suspended matter forming a flocculent precipitate of ferric hydroxide, and this mixed or coagulated sewage from mixer 11 is run over through line 13 into a succeeding settling stage or basin No. 2, indicated by numeral 14, where the settled mass consisting of sludge containing a relative large percentage of ferric hydroxide (generally from 50% to 80% of its solids) resulting from the ferric chloride treatment, is drawn from the bottom of this basin and forced along a pipe 16 to a third mixing tank 17, preferably to enter with the incoming or raw sewage from pipe 18. Paddles 19 in mixing tank 17 effect a mixing of the raw sewage with the ferric hydroxide carrying sludge from basin 14. The mixed mass is drawn out through pipe 20 and run into the settling tanks provided by basin No. 1, from the sump of which the settled combined sludge is drawn out through pipe 21 and conveyed to a filter or any further treatment desired. The partially treated overlying liquid in basin No. 1 is the liquid or settled sewage passed through line 22 to mixer 7 to receive the first addition of ferric chloride as above described.

The effluent from basin No. 2 is, as stated, either passed to waste or run over to any further treatment such as chlorination as indicated through line 24. The treatment results in an over-all reduction of about 85% suspended solids and about 75% of B. O. D., and the effluent is quite free from visible particles and odors.

By the above treatment the ferric hydroxide of the sludge from basin No. 2, mixed with the raw sewage just preceding basin No. 1, fixes the hydrogen sulphide, forming ferrous sulphide, thus at once reducing odors, and at the same time aiding the precipitation of the sludge in basin No. 1 thereby making possible the minimum use of ferric chloride in the process, as well as imparting to the sludge in basin No. 1 a character which makes it much easier to handle in subsequent treatment, especially vacuum filtration. The process may of course be a continuous one, the necessary pumping and handling equipment, sludge concentrators and scrapers in the basins, etc. being well understood and therefore not shown in the diagram.

From the above description it will be seen that any ferric salt which will form a ferric hydroxide sludge may be used in the process.

The return of the treated sludge and mixing with the raw sewage in mixer "d" enables the ferric hydroxide to react with constituents in the sewage which would otherwise use up coagulant. This reduces the quantity of coagulant required. In basin No. 1 the dilution of the sewage is increased as sludge is removed through pipe "g" so that the concentration of water soluble materials in the remaining sludge, decomposition products usually of an ammonical nature, is reduced by the elutriation effected. The net result is a lower coagulant requirement for successful practice of the process while the sludge resulting can be readily dewatered by filtration.

In general practice the capacities of the basins and flow is regulated so as to insure from 1 to 3 hour retention period in each settling stage, and it will be evident that any number of basins, as well as preliminary settling stages may be used, and variations of the process may be introduced as well as additional chemical agents, without departing from the spirit of the invention or its general mode of operation.

This application is in part a continuation of my application Serial No. 552,290 filed July 21, 1931, formerly Patent No. 1,946,818 of February 13, 1934, now application Serial No. 33,867 of July 30, 1935.

I therefore claim:—

1. A sewage treatment for raw sewage containing constituents capable of reacting with $Fe(OH)_3$ consisting of the continuously practiced steps of subjecting an incoming stream of said sewage to sedimentation to settle a sludge therefrom and provide a partially clarified effluent, intimately incorporating a water soluble ferric salt coagulant in said effluent, slowly and gently stirring said coagulant containing effluent to build up a heavy and fast settling floc substantially free of entrained air therein and convert said ferric salt substantially to ferric hydroxide while avoiding settling of said floc, subjecting said effluent containing said heavy and substantially air free built-up floc to sedimentation to settle a secondary sludge containing ferric hydroxide therefrom and provide a substantially innocuous effluent, removing said secondary sludge and intimately incorporating said secondary sludge in said incoming sewage stream to react said ferric hydroxide in said secondary sludge with said raw sewage, and removing from the first sedimentation step a mixed sludge.

2. A sewage treatment for raw sewage containing constituents capable of reacting with $Fe(OH)_3$ consisting of the continuously practiced steps of subjecting an incoming sewage stream to sedimentation to settle a sludge therefrom and provide a partially clarified effluent, adding ferric chloride as a coagulant to said effluent and intimately incorporating said ferric chloride in said effluent, slowly and gently stirring said coagulant containing effluent to build up a heavy and fast settling floc substantially free of entrained air therein and convert said ferric chloride substantially to ferric hydroxide while avoiding settling of said floc, then subjecting said effluent containing said heavy and substantially air free built-up floc to sedimentation to settle a secondary sludge containing ferric hydroxide therefrom and provide a substantially innocuous effluent, removing said secondary sludge and intimately incorporating said secondary sludge in said incoming raw sewage stream to react said ferric hydroxide in said secondary sludge with said raw sewage, and removing from the first sedimentation step a mixed sludge.

3. A sewage treatment for raw sewage containing constituents capable of reacting with $Fe(OH)_3$ consisting of the continuously practiced steps of subjecting an incoming stream of said sewage to sedimentation to settle a sludge therefrom and provide a partially clarified effluent, intimately incorporating a water soluble ferric salt coagulant in said effluent, slowly and gently stirring said coagulant containing effluent to build up a heavy and fast settling floc substantially free of entrained air therein and convert said ferric salt substantially to ferric hydroxide while avoiding settling of said floc, subjecting said effluent containing said heavy and substantially air free built-up floc to sedimentation to settle a secondary sludge containing ferric hydroxide therefrom and provide a substantially innocuous effluent, removing said secondary sludge and intimately incorporating said secondary sludge in said incoming sewage stream to react said ferric hydroxide in said secondary sludge with said raw sewage, removing from the first sedimentation step a mixed sludge, and filtering said mixed sludge.

4. A sewage treatment for raw sewage consisting of the continuously practiced steps of subjecting an incoming stream of said sewage to sedimentation to settle a sludge therefrom and provide a partially clarified effluent, intimately incorporating a ferric compound in said effluent, slowly and gently stirring said ferric compound containing effluent to build up a heavy and fast settling floc substantially free of entrained air therein while avoiding settling of said floc, subjecting said effluent containing said heavy and substantially air free built-up floc to sedimentation to settle a secondary sludge therefrom and provide a substantially innocuous effluent, removing said secondary sludge and intimately incorporating said secondary sludge in said incoming sewage stream, and removing from the first sedimentation step a mixed sludge.

RALPH A. STEVENSON.

CERTIFICATE OF CORRECTION.

Patent No. 2,120,634. June 14, 1938.

RALPH A. STEVENSON.

It is hereby certified that error appears in the printed specification of the above numbered patent requiring correction as follows: Page 2, first column, line 63, and second column, lines 11, 35 and 57-58, claims 1, 2, 3 and 4 respectively, for the words "consisting of" read including; same page, first column, line 68, and second column, lines 15, 40 and 62, claims 1, 2, 3 and 4 respectively, for "said" read the; same page, first column, line 68, and second column, lines 17, 40 and 63, claims 1, 2, 3 and 4 respectively, before "slowly" insert the word then; same page 2, first column, line 73, and second column, line 45, claims 1 and 3 respectively, before "subjecting" insert then; line 66, claim 4, before the syllable "sub-" insert then; and that the said Letters Patent should be read with this correction therein that the same may conform to the record of the case in the Patent Office.

Signed and sealed this 26th day of July, A. D. 1938.

(Seal)

Henry Van Arsdale,
Acting Commissioner of Patents